United States Patent [19]

Summerlin

[11] Patent Number: 4,723,269
[45] Date of Patent: Feb. 2, 1988

[54] METHOD AND APPARATUS FOR POWER-UP OF UNATTENDED COMPUTER

[75] Inventor: Roger N. Summerlin, Grapevine, Tex.

[73] Assignee: Compaq Telecommunications Corporation, Dallas, Tex.

[21] Appl. No.: 812,788

[22] Filed: Dec. 23, 1985

[51] Int. Cl.$^4$ .......................................... H04M 11/00
[52] U.S. Cl. .................... 379/102; 379/105; 307/140
[58] Field of Search .................. 179/2 A, 2 C, 2 DP; 375/8; 379/102, 105, 93, 98; 307/116, 117, 126, 140

[56] References Cited

U.S. PATENT DOCUMENTS

| | | | |
|---|---|---|---|
| 3,549,809 | 12/1970 | Stehr | 11/179 |
| 3,564,346 | 2/1971 | Atkins | 307/116 X |
| 3,783,193 | 1/1974 | Lee | 179/2 A |
| 4,051,326 | 9/1977 | Badagnani et al. | 179/2 DP |
| 4,070,549 | 1/1978 | Baker | 179/2 A |
| 4,100,375 | 7/1978 | Noller | 179/2 A |
| 4,174,517 | 11/1979 | Mandel | 340/310 A |
| 4,197,425 | 4/1980 | Secrett et al. | 179/2 BC |
| 4,206,444 | 6/1980 | Ferlan | 11/340 |
| 4,213,061 | 7/1980 | Conner | 307/116 |
| 4,290,057 | 9/1981 | Knight | 307/116 X |
| 4,353,502 | 10/1982 | Myers | 236/47 |
| 4,356,545 | 10/1982 | West | 364/200 |
| 4,415,774 | 11/1983 | Driver | 179/2 DP |
| 4,433,249 | 2/1984 | Long | 307/126 X |
| 4,538,074 | 8/1985 | Fracker | 307/126 |
| 4,544,923 | 10/1985 | Blatter et al. | 307/140 X |
| 4,547,629 | 10/1985 | Corless | 179/81 R |
| 4,611,277 | 9/1986 | Kemppainen et al. | 364/200 |
| 4,647,721 | 3/1987 | Busan et al. | 379/102 |
| 4,651,023 | 3/1987 | Parsonage | 307/117 |
| 4,656,318 | 4/1987 | Noyes | 379/98 X |
| 4,679,226 | 7/1987 | Muehleisen | 379/102 X |

FOREIGN PATENT DOCUMENTS

| | | | |
|---|---|---|---|
| 0134967 | 8/1984 | Japan | 379/105 |
| 0225659 | 12/1984 | Japan | 379/105 |
| 0225662 | 12/1984 | Japan | 379/105 |

OTHER PUBLICATIONS

Article entitled "Tandy Introduces Powerful Lap-Top Portable", PC Week, p. 10 (Exhibit A).
Advertisement entitled "Turn On ... from Anywhere" (Electronics News), by Dynatech Computer Power, Inc. (Exhibit B).
"Turn-On Appliances Via Long Distance", by James Guilder, Radio Electronics, vol. 48, No. 4, Apr. 1977.
"Remote Computer Power-On Via Switched Telephone Network", by G. J. MacBride & D. R. Reeves, IBM Technical Disclosure Bulletin, vol. 25, No. 6, Nov. 1982.

Primary Examiner—Jin F. Ng
Assistant Examiner—Matthew E. Connors
Attorney, Agent, or Firm—Arnold, White & Durkee

[57] ABSTRACT

An electrical circuit is disclosed which provides the capability of starting up an unattended computer or similar device either from a remote location or at a predetermined date and time. The circuit includes an electrical energy storage device which, when a telephone ring signal is detected, initiates start-up of the computer. Alternatively, an interrupt from a date timer may initiate start-up of the computer using the energy storage device. Once start-up of the computer is initiated, its power supply provides the necessary voltage which, in conjunction with a latching transistor, maintains the electrical circuit providing AC power to the power supply and computer and recharges the electrical energy storage device. Finally, an electrical signal to power-down the computer may be initiated either remotely or through software instruction.

32 Claims, 3 Drawing Figures

METHOD AND APPARATUS FOR POWER-UP OF UNATTENDED COMPUTER

FIELD OF THE INVENTION

This invention pertains to computers and similar equipment and more particularly to power-up of such devices while they are unattended.

BACKGROUND OF THE INVENTION

Computers and similar equipment have had the capability for a number of years to communicate via telephone lines through the use of modems and telephones. The general practice has been for the user to power-up his own computer and then, by means of a telephone, "call up" a computer operating at a remote location. If a user desired to receive messages on his computer, he was obliged to leave the computer powered up during the time in which he wished to receive data transmissions. Without leaving the computer on, the user gave up the ability to send and receive those transmissions.

The practice of leaving one's telecomputing equipment powered up while unattended has many disadvantages. The computer which is powered up and left unattended represents an increased safety hazard which can risk damage to either the computer itself or its surrounding environment, or both. There is continuous power consumption as well as equipment damage susceptibility due to power failures. Further, numerous extended periods of operation will decrease the reliability of the computer and its useful life will be significantly shortened.

SUMMARY OF THE INVENTION

Applicant's invention overcomes the above-mentioned disadvantages by providing a method and apparatus for powering up a computer from a remote location. The computer can be turned off while unattended and, when it is desired that the computer send or receive data, it can be powered up from a remote location or at a predetermined time, send or receive data, and then power down automatically.

The preferred embodiment of the apparatus comprises a telephone ring detector which is connected to the incoming telephone line to detect the ringing signal. A switch in the power-up circuitry is closed when the detector detects the telephone ringing signal. Upon the closing of the switch and completion of the power-up circuit, an energy storage device causes a power-up signal to be sent through the computer power supply and power-up of the computer is initiated. After the computer is powered up and the telephone signal is cleared, the computer sustains itself by means of its power supply.

The remote power-up circuitry also includes the capability of detecting an interrupt signal generated by the date timer contained within the computer and, in response thereto, a switch is closed which once again completes the power-up circuit. The computer is powered up in the above-described manner. The use of the date timer enables the user to preprogram the date and time at which the computer will be powered up.

It is therefore an object of the present invention to provide a method and apparatus for causing a computer to be powered up either from a remote location or at a predetermined day and time, thus eliminating the need for long-term continuous operation of the computer.

Other objects and advantages will become obvious to those skilled in the art upon review of the detailed description in conjunction with the drawing and appended claims.

DETAILED DESCRIPTION OF THE INVENTION

Figure 1:
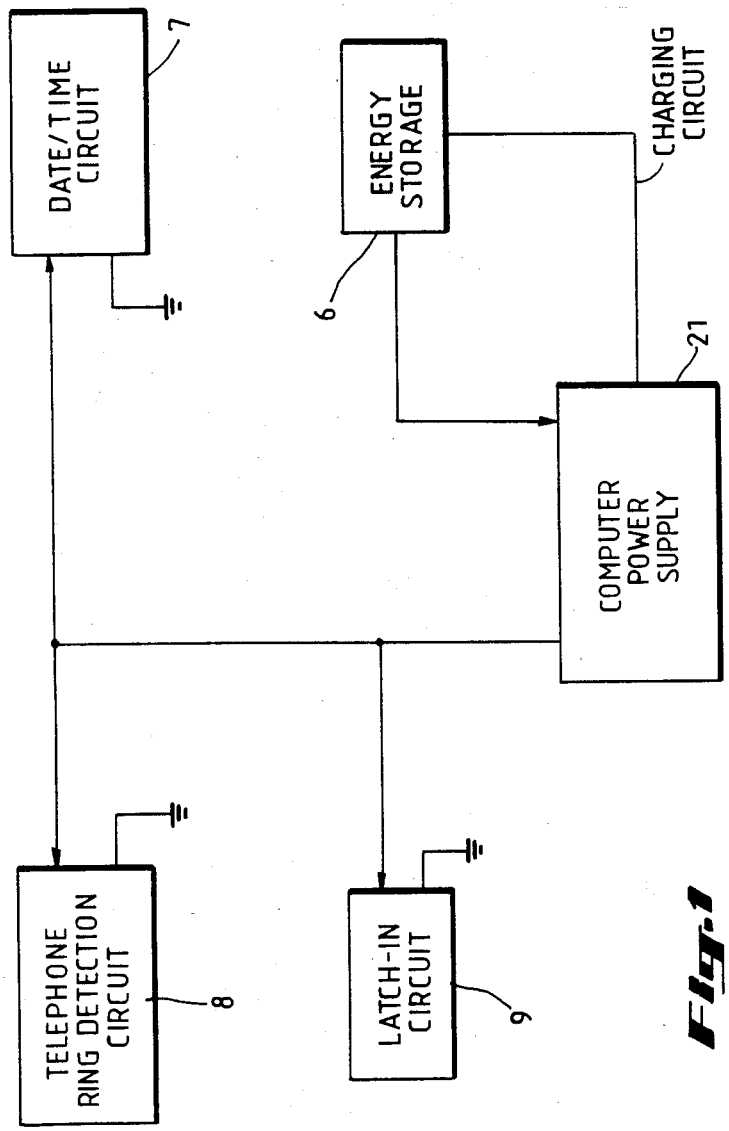
FIG. 1 is a block diagram showing the primary components of one embodiment of the apparatus of the present invention.

FIG. 1 is a block diagram showing the primary components of one embodiment of the present invention and the direction of current flow through the circuit. Very broadly, the apparatus comprises an energy storage device 6, a date/time circuit 7, a telephone ring detection system 8, and a latch-in circuit 9. The computer power supply 21 generally exists in the computer, although external supplies may be used.

Figure 2:
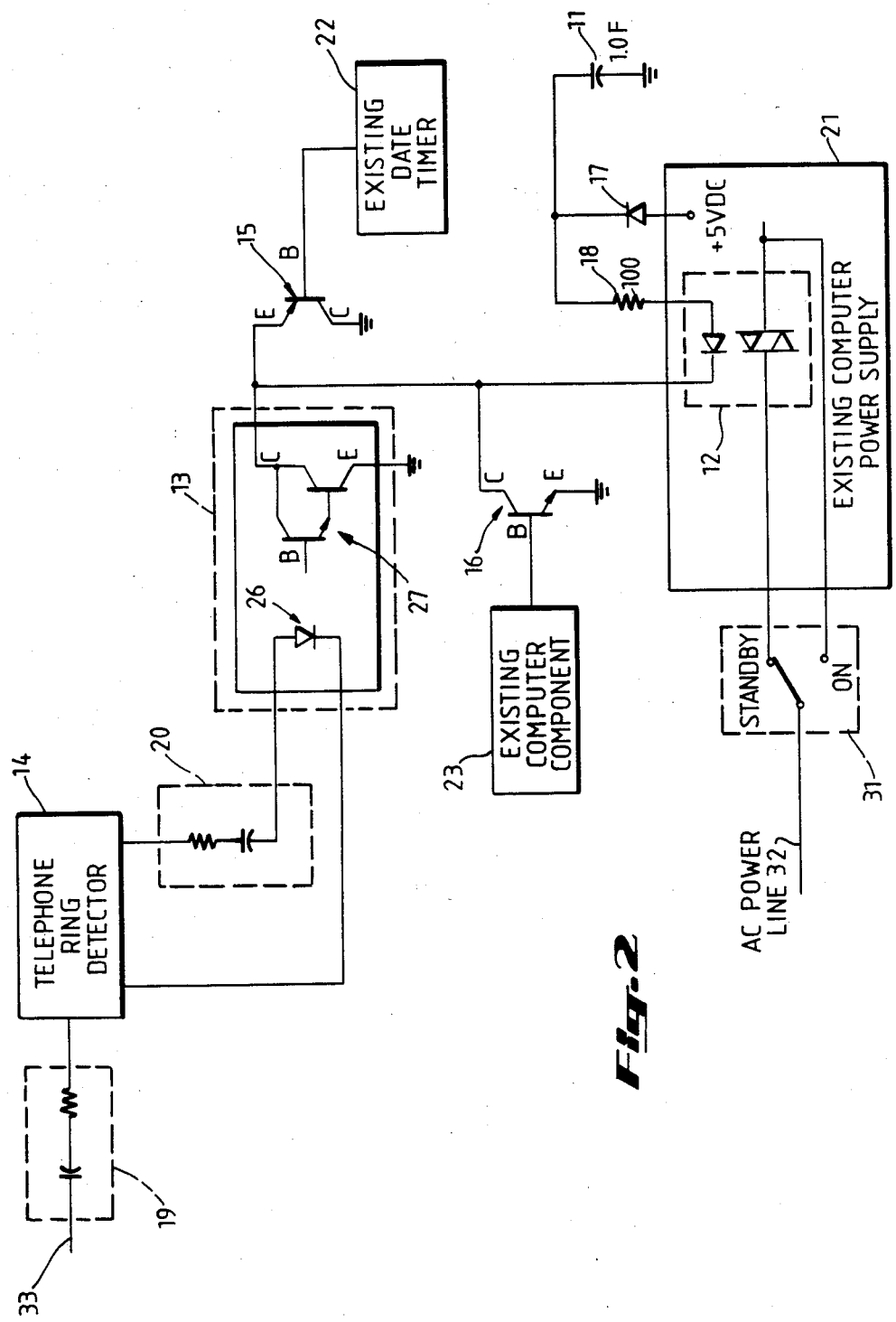
FIG. 2 is a simplified schematic of one circuit of the present invention showing the main components thereof.

FIG. 2 is a simplified schematic of one embodiment of the present invention. The remote start-up circuitry generally comprises capacitor 11, opto-coupled triac 12, opto-coupler 13, telephone ring detector 14, transistor 15, and latching transistor 16. Also shown in FIG. 2 are certain existing components of the computer utilizing the remote start-up capability. Among those existing components are the power supply 21, date timer 22, and computer component 23.

Opto-coupled triac 12 is preferably installed within the existing computer power supply 21. The anode terminal of the primary of triac 12 is connected to capacitor 11 by way of a 100 ohm resistor 18. The connections to the cathode of the primary of triac 12 will be more fully described below. The secondary of opto-coupled triac 12 is connected in the stand-by power circuit of power supply 21.

Capacitor 11 is a 1.0 farad capacitor, the positive terminal of which is connected to the anode of triac 12 through resistor 18 as described above. The negative terminal of capacitor 11 is connected to electrical ground within the computer. Also connected to the positive terminal of capacitor 11 is the cathode terminal of diode 17. The anode of diode 17 is connected to a +5-volt DC output of power supply 21.

The cathode of the primary of opto-coupled triac 12 is connected to opto-coupler 13, transistor 15, and latching transistor 16. Transistor 15 is a 2N2907, or equivalent, transistor with its emitter connected to the cathode of triac 12. The collector of transistor 15 is connected to electrical ground within the computer. The base terminal of transistor 15 is connected to the "interrupt" terminal of the existing date timer 22 within the computer. The interrupt timer is preferably a CMOS device which stores and updates the time and date once initiated by the operator. Such a timer is known in the art.

Transistor 16 is a 2N2102, or equivalent, transistor whose collector is electrically connected to the cathode of triac 12. The emitter of transistor 16 is connected to electrical ground and the base terminal is connected to existing computer component 23.

Component 23 generates an electrical signal whenever the computer is operational, or until receiving a computer instruction to cease, and this signal, in the preferred embodiment of the present invention, is applied to the base terminal of transistor 16. As a result, during operation of the computer, transistor 16 is in a conducting state, providing an electrical path for flow of current through triac 12.

Opto-coupler 13 is an electrical isolating device which generally comprises a diode 26 and a transistor, or transistor pair, 27. The collector of transistor 27 is connected to the cathode of opto-coupled triac 12, while the emitter of transistor 27 is connected to electrical ground. The base terminal of transistor 27 is not used in this application of opto-coupler 13. Although a cascading transistor pair is shown in FIG. 2, a single transistor or similar device will perform the required function.

Electrically isolated from transistor 27 is diode 26. Diode 26 is connected across the output terminals of telephone ring detector 14 by means of RC network 20. An incoming telephone line 33 is connected to the input of ring detector 14 by means of RC network 19. Networks 19 and 20 will be more fully explained below.

Figure 3:
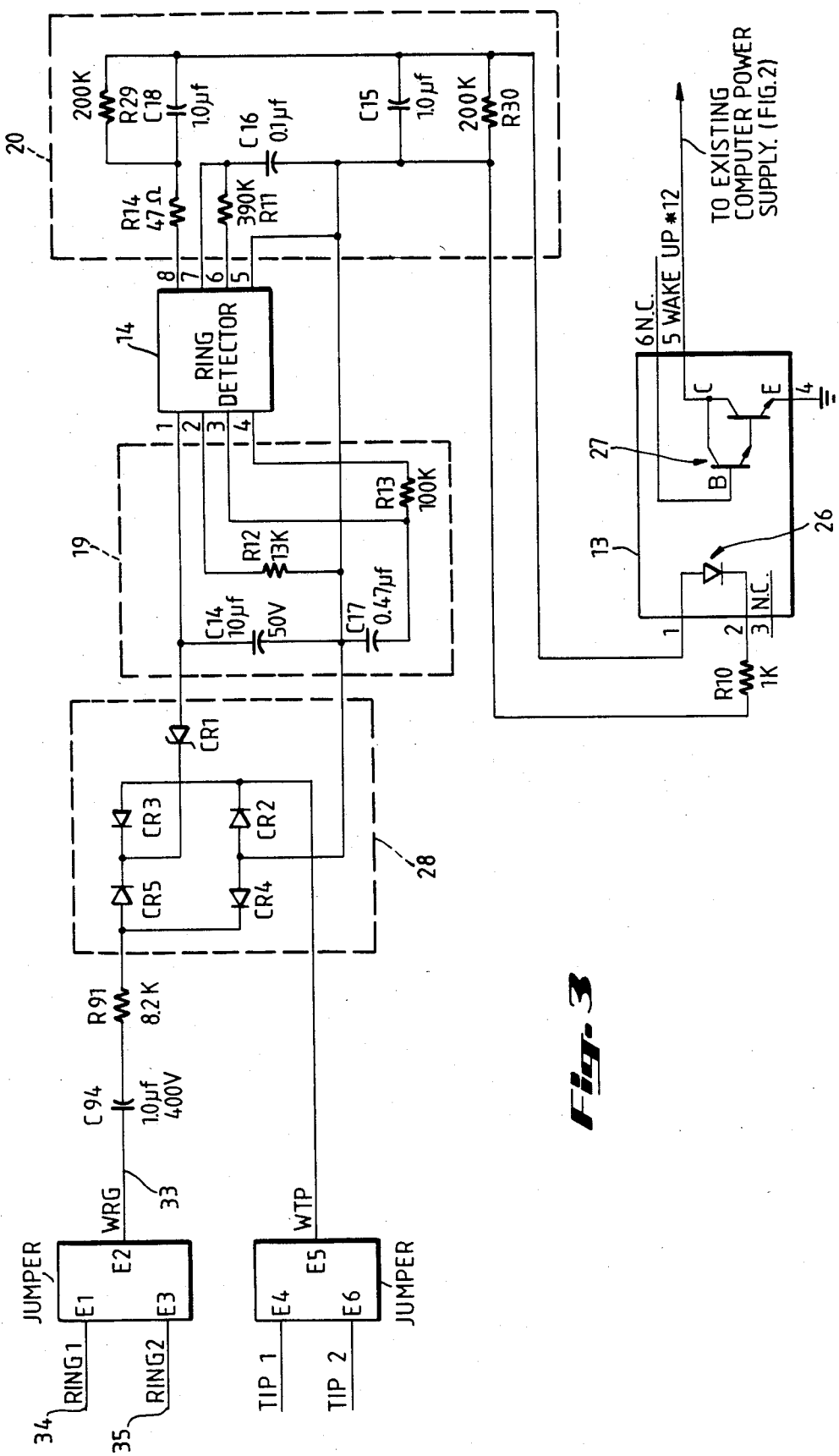
FIG. 3 is a schematic showing a telephone ring detection circuit and its associated opto-coupler.

FIG. 3 illustrates telephone ring detector 14, RC networks 19 and 20, and opto-coupler 13. Telephone ring detectors are well known in the art and a variety of different detectors will function satisfactorily for purposes of the present invention. It should be remembered that this is only one embodiment of a component of the present invention.

As shown in FIG. 3, ring detector 14 has four input terminals and four output terminals. The four input terminals are connected to the incoming telephone line 33 by way of a series of resistors and capacitors and a diode bridge 28. The series of resistors and capacitors shown connected to terminals 1 through 4 of ring detector 14 comprise RC network 19. The series of resistors and capacitors connected to terminals 5 through 8 of ring detector 14 comprise RC network 20. RC networks 19 and 20 help insure that erroneous detection of ringing signals is minimized and numerous configurations of such networks may be substituted for those shown to perform a like function.

The embodiment illustrated in FIG. 3 may be connected to either of two telephone ring circuits 34 or 35 by way of diode bridge 28.

The operation of the remote power-up circuit may be understood by reference to FIG. 2 and is substantially as follows:

When the computer system is powered up by moving the power switch 31 to the "on" position, computer power supply 21 provides DC power for operation of the computer. A +5-volt output from power supply 21 charges capacitor 11 through diode 17 to a voltage of approximately 4.4 volts. When the system is powered down, capacitor 11 will retain its stored energy and, after approximately 90 days, the voltage will still be approximately 2.0 volts, sufficient to initiate start-up of the computer. Under ideal conditions, capacitor 11 will retain sufficient energy to initiate start-up for as long as 180 days.

Once capacitor 11 has been charged, the computer is powered down and switch 31 is placed in the "standby" position. In this position, the computer remains powered down as the secondary of opto-coupled triac 12 acts as an "open" switch, preventing application of external power to the computer power supply 21.

With the computer switch 31 in the "stand-by" position, two independent conditions can initiate start-up of the power supply using the remote power-up circuitry. The computer will be powered up when an electrical ringing signal is detected on the telephone circuit 33. The computer will also be powered up if an interrupt is issued from the existing date timer 22 in the computer.

As explained above, telephone ring detector 14 is connected to an incoming telephone line 33. When an electrical signal appears on the telephone line 33 denoting a ringing signal, ring detector 14 detects said signal on its input terminals 1 through 4. In response to that detected signal, detector 14 generates an electrical signal at its output terminals 5 through 8. A current is caused to flow through diode 26 of opto-coupler 13.

The flow of current through diode 26 causes transistor 27 of opto-coupler 13 to begin to conduct. Opto-coupler 13 functions much like an isolating relay in that a current flowing through its primary component, diode 26, causes its secondary component, transistor 27, to conduct. Transistor 27 therefore functions as a switch which closes upon application of electrical current to, or energization of, diode 26.

As transistor 27 begins to conduct, an electrical circuit is completed from capacitor 11, through resistor 18 and optocoupled triac 12, through transistor 27. The electrical energy stored in capacitor 11 begins to discharge causing a flow of current through the primary component of opto-coupled triac 12. This flow of current through the primary component of triac 12 causes the secondary component of triac 12 to begin to conduct. As in the case of opto-coupler 13, opto-coupled triac 12 acts as a relay and the secondary component of triac 12 functions as a switch, closing upon application of electrical power to the primary and completing the power circuit in the computer power supply 21.

As the secondary of opto-coupled triac 12 begins to conduct, external AC power is applied to the power supply 21 through the stand-by power circuit. Power supply 21 begins supplying DC power necessary to operate the computer. The +5-volt DC supply connected to diode 17 is therefore available, replacing the need for additional discharge of capacitor 11 through the primary of opto-coupled triac 12. In addition, the +5-volt DC source operates to recharge capacitor 11 to its 4.4 volt value.

As start-up of the computer is initiated, an electrical latch-in signal is generated via existing computer component 23 to the base terminal of latch-in transistor 16. Application of the latch-in signal to transistor 16 causes the collector and emitter of transistor 16 to begin to conduct. As a result, latch-in transistor 16 performs essentially the same function as transistor 27 of opto-coupler 13, providing an alternate switch for completion of the power-up circuit.

Substantially less than one second of time is required to initiate start-up of the power supply, provide the +5-volt DC supply, and apply the latch-in signal to transistor 16. The telephone ringing signal lasts for more than one second. Consequently, in the space of one ringing signal, the computer is caused to begin power-up and latch itself in. When the ringing signal is cleared, opto-coupler 13 drops out and transistor 27 ceases to conduct. However, by that time, latch-in transistor 16 has begun to conduct and opto-coupled triac 12 is latched in.

The second mode of powering up the unattended computer involves the generation of an interrupt signal by the date timer 22 located in the computer. The date timer 22 can be preprogrammed to generate the interrupt at a preselected time. At the preselected time, the interrupt is generated and the signal is applied to the base terminal of transistor 15. Application of the signal to the base of transistor 15 causes the collector and emitter to begin to conduct. Transistor 15 acts as a switch which closes in response to the interrupt signal and completes the remote power-up circuit similar to the function of transistor 27 of opto-coupler 13.

Similar to the power-up described above, as transistor 15 begins to conduct, capacitor 11 begins to discharge through opto-coupled triac 12 and transistor 15. The flow of current through the primary of triac 12 causes the secondary of triac 12 to begin to conduct, causing power to be applied to the computer power supply 21.

As before, initiation of the start-up causes the +5-volt DC source to become available and the latch-in signal to be generated by way of the existing computer component 23 and applied to the base terminal of latch-in transistor 16. As before, the opto-coupled triac 12 is latched in.

Once the system has been remotely powered up, the remote user may send data to or receive data from the computer by means of conventional modems. This type of data transmission is well known in the art. When data transmission is complete, the system may be powered down by causing the computer to cease the generation of the latch-in signal. This may be performed by an instruction initiated in a computer program or initiated in response to an instruction received from a remote source.

When the latch-in signal is interrupted and is no longer applied to the base terminal of latch-in transistor 16, transistor 16 ceases to conduct, thus opening the remote power-up circuit. Because transistors 15 and 27 are also no longer conducting, current ceases to flow through the primary of opto-coupled triac 12. Triac 12 "drops out" and its secondary ceases to conduct. This "opening of the switch" interrupts the application of AC power to the computer power supply 21 and the computer is caused to power-down.

As stated earlier, while the computer is operating, capacitor 11 is being recharged through diode 17 by the +5-volt DC supply to its storage value of 4.4 volts. When the computer has been remotely powered down, capacitor 11 will once again retain its charge for an extended period of time, ready to initiate another start-up upon receipt of a telephone ring signal or an interrupt from the computer date timer 22.

Although the telephone ring detection system described above demonstrates the preferred mechanism and method for detection of a remotely generated power-up signal, various other remote signals may be used, resulting in variations in the detection scheme. For example, a remotely generated signal may be transmitted via microwave or other communication system and the detection scheme may be altered to more nearly resemble the detection scheme utilizing transistor 15 described above. In other words, the detection of a remotely generated signal does not necessitate the use of an isolating device, such as opto-coupler 13; rather, the remote signal may be directly applied to the base terminal of a transistor, as in transistor 15, causing it to conduct electrical current through its collector and emitter. Devices other than the semiconductor devices described herein could also be used to perform similar functions.

Further, energy storage device 11, although shown to be a capacitor in the preferred embodiment, could be a battery, rechargeable or otherwise, or could even be a DC supply maintained by an available AC source, such as at switch 31. The energy source 11 need not be a passive storage device but, rather, may be an active source.

As can be appreciated by one skilled in the art, the above detailed description describes only one embodiment of the present invention. Various components may be replaced by other electrical, electromechanical, or semiconductor devices to accomplish the same result, particularly in view of the interchangeable nature of such devices and their functions in the present invention. Variations and modifications of the invention will become obvious from the drawings and specification. Accordingly, applicant's invention should be limited only by the scope of the appended claims.

What is claimed is:

1. An apparatus for powering-up an unattended computer, comprising:
   (a) a source of stored electrical energy;
   (b) a power supply operable to power-up said computer;
   (c) a switch adapted to receive an electrical signal and responsive to said signal to close;
   (d) an electrical circuit functionally interconnecting said source, said switch, and said power supply, said switch operable to complete said electrical circuit in response to said electrical signal to apply said stored energy to the primary of an opto-coupled triac, the triac responsive to the stored energy to close a power circuit connecting an external source of AC electrical power to the power supply, the power supply providing electrical power to the computer,
wherein no electrical power is utilized by the apparatus prior to the receipt of the electrical signal by the switch.

2. The apparatus of claim 1, further comprising a relay interposed between said electrical circuit and said power supply, said relay operable to receive said stored electrical energy upon completion of said electrical circuit and responsive to said stored energy to complete a power circuit in said power supply.

3. The apparatus of claim 1 wherein said electrical signal is generated in response to a telephone ring signal.

4. The apparatus of claim 1 wherein said electrical signal is generated at a preselected time by an internal clock within the computer.

5. The apparatus of claim 1, further comprising a recharging circuit connected to said source for recharging said source.

6. The apparatus of claim 2, further comprising a latching circuit connected to said relay to maintain said relay in an energized condition indefinitely.

7. The apparatus of claim 1, wherein said source is a capacitor.

8. An apparatus for starting up an unattended computer, comprising:
   (a) a source of stored electrical energy;
   (b) a detector adapted to receive a first electrical signal;
   (c) a power supply operable to start up said computer;
   (d) a relay having primary and secondary components;
   (e) an electrical circuit interconnecting said source, said detector, and said primary component of said relay; and (f) a power circuit connecting said power supply to a source of electrical power through the secondary component of said relay, said detector operable to complete said electrical circuit upon receipt of said first electrical signal and the secondary component operative to complete the power circuit when the electrical circuit is complete, and wherein no electrical power is consumed by the source, the detector, the power supply and the relay prior to receipt of the first electrical signal by the detector.

9. The apparatus of claim 8 wherein said detector is responsive to said first electrical signal to generate a second electrical signal and wherein said detector further comprises a switching means adapted to receive said second electrical signal and responsive to said second electrical signal to complete said electrical circuit.

10. The apparatus of claim 9 wherein said first electrical signal is generated at a location remote from said computer.

11. The apparatus of claim 9 wherein said detector is a telephone ring detector.

12. The apparatus of claim 8 wherein said first electrical signal is generated at a preselected time by an internal clock within the computer.

13. The apparatus of claim 8 wherein said electrical circuit conveys said stored electrical energy from said source to said primary component of said relay.

14. The apparatus of claim 13 wherein said secondary component of said relay is a switch operative to complete said power circuit in response to conveyance of said stored electrical energy to said primary component.

15. The apparatus of claim 8, further comprising a timer operable to generate said first electrical signal at a preselected time.

16. An apparatus for activating an unattended computer power supply, comprising:
(a) a source of stored electrical energy;
(b) a relay device having a primary component and a first switch, said first switch operative to close in response to flow of electrical current through said primary component;
(c) a second switch operative to close in response to an electrical signal;
(d) an electrical circuit interconnecting said source, said primary component of said relay, and said second switch; and
(e) a power circuit interconnecting said first switch of said relay, said power supply, and a source of electrical power for powering up the power supply, the apparatus requiring no external source of electrical power to respond to the electrical signal, wherein the source of stored electrical energy causes a flow of electrical current through the primary component of the relay when the second switch closes, and wherein the first switch causes the power circuit to connect the source of electrical power to the power supply so that the power supply powers up the computer.

17. The apparatus of claim 16, further comprising:
(a) a latch-in switch; and
(b) a latch-in circuit interconnecting said latch-in switch, said primary component of said relay, and an output of said power supply.

18. The apparatus of claim 16, further comprising a recharging circuit interconnecting said power supply with said storage device.

19. The apparatus of claim 16, wherein said second switch further comprises:
(a) a telephone ring detector responsive to a telephone ringing signal to generate said electrical signal; and
(b) a third switch connected to said detector and operative to close in response to said electrical signal.

20. The apparatus of claim 16, further comprising a timer operable to generate said electrical signal at a preselected time.

21. A method for powering-up an unattended computer, comprising the steps of:
(a) storing an electrical charge;
(b) passively detecting an electrical power-up signal;
(c) completing an electrical circuit in response to said electrical signal;
(d) applying said electrical charge to energize a primary component of a relay in said electrical circuit;
(e) closing a secondary component of the relay in response to the energization of the primary component; and
(f) completing an AC power circuit, through the secondary component, in a power supply in said computer, the completing of the AC power circuit causing the power supply to power-up the computer.

22. The method of claim 21, further comprising generating the electrical signal from a location remote from said computer.

23. The method of claim 21, further comprising automatically generating the electrical signal at a preselected time.

24. The method of claim 21, further comprising the step of completing a latch-in circuit.

25. The method of claim 24, further comprising the step of generating a second electrical signal to cause said computer to power down.

26. The method of claim 21, further comprising the step of restoring said electrical charge.

27. A method of control of an unattended computer power supply, comprising the steps of:
(a) storing electrical energy in an energy storage device;
(b) generating a first electrical signal;
(c) detecting said first electrical signal;
(d) completing an electrical circuit in response to said detected signal;
(e) applying said stored electrical energy to a primary component of an isolating relay through said electrical circuit;
(f) applying an external source of AC electrical power to the power supply through a secondary component of the isolating relay;
(g) closing a latch-in circuit for maintaining the application of electrical energy to the primary component of the isolating relay;
(h) restoring electrical energy to said energy storage device; and
(i) generating a second electrical signal to cause said power supply to power-down wherein no electrical power is consumed in the electrical circuit prior to detecting the first electrical signal and after generating the second electrical signal.

28. The method of claim 27 further comprising generating said first electrical signal at a location remote from said power supply.

29. The method of claim 27 further comprising automatically generating an electrical signal at a preselected time.

30. A system for remotely powering-up an unattended computer, comprising:
(a) a passive telephone ring detection means electrically connected to a telephone line for detecting an electrical ring signal conveyed by the line and for closing a first electrical switch means in response to a detected signal;
(b) a capacitor for storing an electrical charge; and
(c) a relay means having primary and secondary components, the components being electrically separated, the primary component being electrically connected to the capacitor and to the first electrical switch means, whereby the capacitor discharges through the primary component when the first switch means is closed, and the secondary component comprising a second electrical switch means connected between a source of AC electrical power and a power supply, the second switch means operative to close when the capacitor discharges through the primary component to connect the source of AC electrical power to the power supply, the power supply operative to power-up the computer, wherein the system consumes no electrical power from the telephone line or from the source of electrical power prior to the detection of the electrical ring signal.

31. The system of claim 30, further comprising:
a latching switch means connected to the primary component in electrical parallel to the first switch means, the latching switch means adapted to receive a signal from the computer and responsive to said signal to close to maintain electrical power at the primary component of the relay.

32. The system of claim 31, further comprising:
a start-up switch means adapted to receive an electrical signal at a pre-programmed date and time and responsive to the signal to close,
the start-up switch means connected to the primary component in electrical parallel to the first switch means and to the latching switch means.

* * * * *